US012757037B2

(12) United States Patent
Kim et al.

(10) Patent No.: US 12,757,037 B2
(45) Date of Patent: Oct. 6, 2026

(54) FRAMEWORK FOR ML-BASED ANALYTICS AND OPTIMIZATIONS FOR RADIO ACCESS NETWORKS

(71) Applicant: Microsoft Technology Licensing, LLC, Redmond, WA (US)

(72) Inventors: Daehyeok Kim, Redmond, WA (US); Ganesh Ananthanarayanan, Samamish, WA (US); Bozidar Radunovic, Cambridge (GB); Xenofon Foukas, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 18/334,164

(22) Filed: Jun. 13, 2023

(65) Prior Publication Data

US 2024/0422576 A1 Dec. 19, 2024

(51) Int. Cl.
*H04W 24/02* (2009.01)
*H04W 80/12* (2009.01)

(52) U.S. Cl.
CPC ............ *H04W 24/02* (2013.01); *H04W 80/12* (2013.01)

(58) Field of Classification Search
CPC ......... H04W 28/0268; H04W 28/0231; G06N 3/092; G06N 3/044; G06N 3/08;
(Continued)

(56) References Cited

U.S. PATENT DOCUMENTS 12,413,475 B2 * 9/2025 Ying .................. H04L 41/0894
2022/0014963 A1 * 1/2022 Yeh .................. H04W 28/0268
(Continued)

FOREIGN PATENT DOCUMENTS

WO 2023091664 A1 5/2023

OTHER PUBLICATIONS

Angelo Feraudo, "PhD Forum Abstract: Vehicular-based Support to Cooperative Edge Computing based Applications in Next-gen Networks", Proceedings of the 22nd International Conference on Information Processing in Sensor Networks, May 9, 2023, pp. 352-353.
(Continued)

*Primary Examiner* — Mahran Y Abu Roumi
(74) *Attorney, Agent, or Firm* — ArentFox Schiff LLP

(57) ABSTRACT

A system, method, and computer-readable media for executing applications for radio interface controller (RIC) management are disclosed. The system includes one or more far-edge datacenters including first computing resources configured to execute a radio access network (RAN) function and a real-time RIC; one or more near-edge datacenters including second computing resources configured to execute a core network function and at least one of a near-real-time RIC or a non-real-time RIC; and a central controller. The central controller is configured to: receive inputs of application requirements, hardware constraints, and a capacity of the first and the second computing resources; select, based on a policy applied to the inputs, a location a far-edge datacenter or a near-edge datacenters for executing each of a plurality of applications to form a pipeline; and deploy each of the applications to the real-time RIC, the near-real-time RIC, or the non-real-time RIC based on the selected location.

22 Claims, 6 Drawing Sheets

(58) Field of Classification Search
CPC ...... G06N 3/045; G06N 3/084; G06N 3/0442; G06N 3/098; G06N 3/006; G06N 7/01
See application file for complete search history.

(56) References Cited

U.S. PATENT DOCUMENTS

| | | | | |
|---|---|---|---|---|
| 2023/0110752 | A1 | 4/2023 | Wolman et al. | |
| 2024/0162955 | A1 * | 5/2024 | Whinnett | H04W 24/10 |

OTHER PUBLICATIONS

International Search Report and Written Opinion received for PCT Application No. PCT/US2024/032176, Sep. 16, 2024, 16 pages.

International Preliminary Report on Patentability (Chapter I) received for PCT Application No. PCT/US2024/032176, mailed on Dec. 26, 2025, 10 Pages.

* cited by examiner

FRAMEWORK FOR ML-BASED ANALYTICS AND OPTIMIZATIONS FOR RADIO ACCESS NETWORKS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system for executing applications for radio interface controller (RIC) management, including: one or more far-edge datacenters each including first computing resources configured to execute a radio access network (RAN) function and a real-time RIC; one or more near-edge datacenters each including second computing resources configured to execute a core network function, a near-real-time RIC, and a non-real-time RIC; and a central controller configured to: receive inputs of application requirements, hardware constraints, and a capacity of the first computing resources and the second computing resources; select, based on a policy applied to the inputs, a location at the one or more far-edge datacenters or the one or more near-edge datacenters for executing each of a plurality of applications to form a pipeline; and deploy each of the plurality of applications to the real-time RIC, the near-real-time RIC, or the non-real-time RIC based on the selected location.

In some aspects, the techniques described herein relate to a method for executing applications for radio interface controller (RIC) management of virtualized network functions, including, at a central controller: receiving inputs of application requirements, hardware constraints, and a capacity of: one or more far-edge datacenters each including first computing resources configured to execute a radio access network (RAN) function and a real-time RIC; and one or more near-edge datacenters each including second computing resources configured to execute a core network function, a near-real-time RIC, and a non-real-time RIC; selecting, based on a policy applied to the inputs, a location at the one or more far-edge datacenters or the one or more near-edge datacenters for executing each of a plurality of applications to form a pipeline; and deploying each of the plurality of applications to the real-time RIC, the near-real-time RIC, or the non-real-time RIC based on the selected location.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
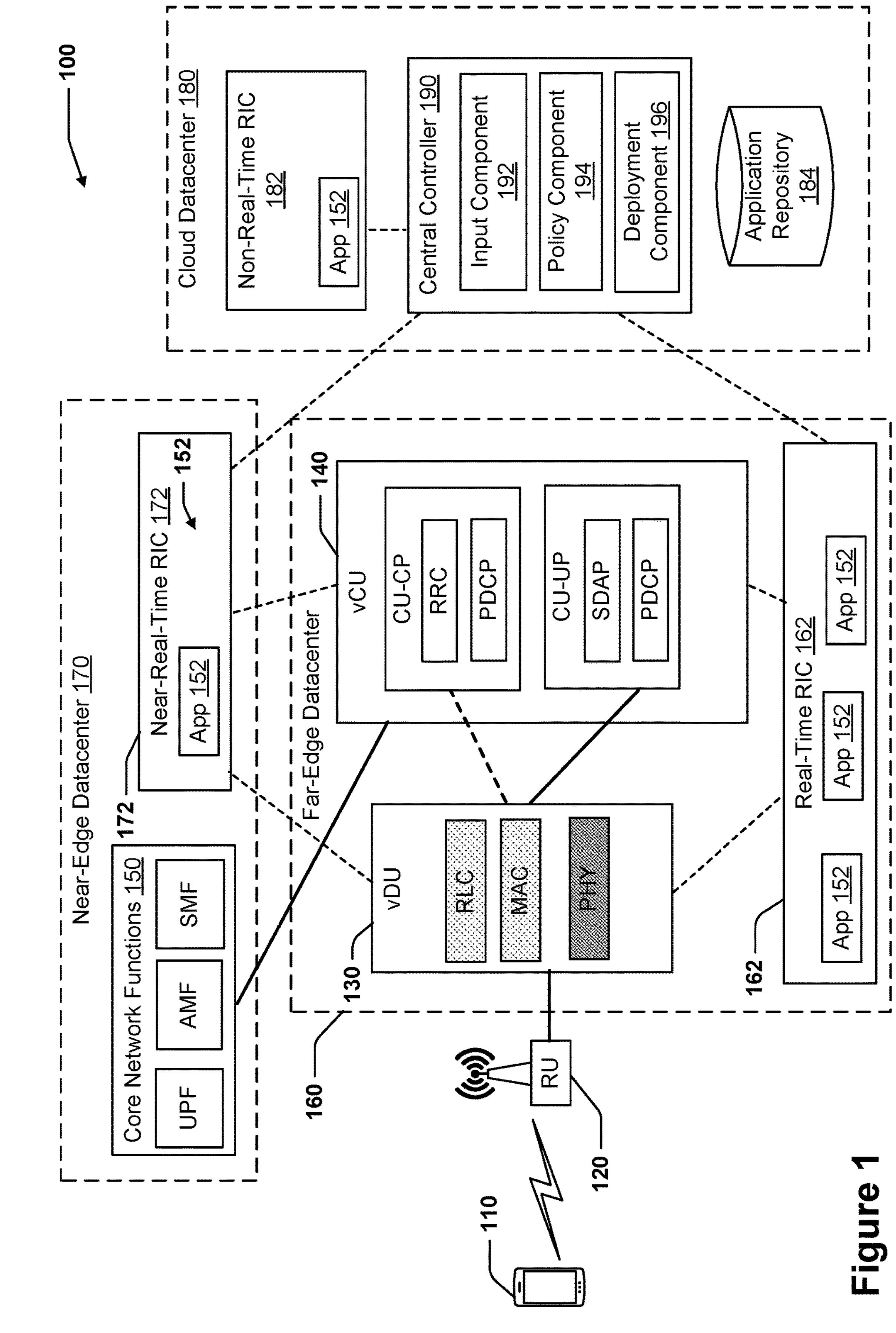
FIG. 1 is a diagram of an example virtualized radio access network (vRAN) that provides connectivity to a user equipment (UE).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a framework for machine-learning (ML)-based analytics and optimizations for radio access networks (RANs). A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

Despite this compelling vision, the opportunity for innovation still largely remains untapped because of two main challenges. The first challenge is related to the flexible data collection for monitoring and telemetry applications. The RAN functions can generate huge volumes of telemetry data at a high frequency (e.g., gigabytes per second). Collecting, transferring, and processing this data can put a strain on compute and network capacity. A conventional approach, standardized by the 3$^{rd}$ generation partnership project (3GPP), defines a small set of aggregate cell key performance indicators (KPIs) collected every few seconds or minutes. The O-RAN RIC extends this idea by providing new KPIs at a finer time granularity. The O-RAN RIC may be classified as a near real-time RIC. Each KPI is defined through a service model (a form of API), most of them standardized by O-RAN. However, this approach is slow to evolve and does not scale well because of a limited number of initial use cases and a need to standardize new proposals. The second challenge is due to the real-time nature of many RAN control and data plane operations. Any new functionality added to these operations, in order to support a new service model, must be completed within a deadline, typically ranging from microseconds (μs) to a few milliseconds (ms). A deadline violation may cause performance degradation or even crash a vRAN. Any changes on these critical paths can create substantial design challenges and make RAN vendors reluctant to add new features.

A virtual RAN (vRAN) deployment may have flexibility as to which resources are used to implement various functions. Generally, a wide-area network has different types of datacenters in different locations. For example, a large-scale datacenter may include hundreds or thousands of servers or server-racks including various types of memory and processors (e.g., central processing units (CPUs) and graphics processing units (GPUS). Such large-scale datacenters may be referred to as cloud datacenters and may provide economies of scale for operations that are geographically agnostic. For a vRAN, however, geography becomes important. For instance, in order to provide physical layer vRAN functions, a datacenter must have a direct connection with a radio unit (RU) such that the datacenter can meet latency requirements. Such a datacenter with a connection to a RU may be referred to as a far-edge datacenter. A far-edge datacenter, however, may be limited in resources. For example, a far-edge datacenter may be located in an urban area where real estate is expensive and resources such as electricity and water for cooling may be limited. Accordingly, a far-edge datacenter may have fewer and more limited computing resources and such resources may be more expensive to operate. A near-edge datacenter may be between a cloud datacenter and a far-edge datacenter in terms of location, resources, and cost. For instance, a near-edge datacenter may not have a direct connection to a RU, but may have a larger number of processors (including GPUs) than a far-edge datacenter. A near-edge datacenter may still offer advantages over a cloud-datacenter in terms of latency.

A vRAN may include one or more radio intelligent controllers (RICs) configured to provide additional analysis and control for the vRAN. In some implementations, basic or standardized functions of a RAN may be implemented as vRAN functions. The RIC may enhance, extend, or customize the vRAN functions. For example, a RIC may utilize artificial intelligence (AI) or machine-learning (ML) models to improve cost and performance of a vRAN via prediction, classification, and solving computationally intractable problems in RAN management. The RIC may collect information from various vRAN functions for providing analysis and control. In an aspect, RICs may be classified based on latency, which may in turn depend on geographic proximity to the RU. For example, RICs may include real-time RICs that are co-located with vRAN functions at a far-edge datacenter, near-real-time RICs that are located at a near-edge datacenter, and non-real time RICs that may be located at a near-edge datacenter or cloud datacenter.

The demands and resources of a vRAN and the RICs may change over time. For example, when a particular cell of the vRAN has a high number of users (e.g., mobile devices), the far-edge datacenter executing the vRAN functions may dedicate more resources (processors and memory) to the vRAN functions, and may have less capacity for RIC operation. Further, the changes in vRAN load may also affect the types of RIC operations that are useful. For instance, an enhanced scheduler using ML may provide greater advantages when the cell is busy. Accordingly, a static design for a RIC may have difficulty operating due to resource constraints that vary based on the vRAN load. Therefore, there is a need for a flexible RIC design to improve resource utilization while satisfying latency requirements in a vRAN.

In an aspect, the present disclosure describes a computing system for hosting both vRAN functions and executing applications for RIC management. In an example implementation, the computing system is a wide-area network including multiple datacenters that are classified as far-edge datacenters, near-edge datacenters, and cloud datacenters. Generally, the lower layer vRAN functions are executed on the far-edge datacenters and core network functions are executed on the near-edge datacenters. The far-edge datacenters also execute a real-time RIC, and the near-edge datacenters also execute a near-real-time RIC. The cloud datacenters may execute a non-real-time RIC, which may also be executed at a near-edge datacenter. Each of the RICs is configured to execute one or more applications. The applications are isolated from the vRAN functions and/or core network functions using a virtual machine (VM), a container, web assembly code, or extended Berkeley packet filter (eBPF) code. Some of the applications are configured to apply network data to a machine-learning model. The computing system further includes a central controller configured to manage the applications on the different RICs. For example, the central controller receives inputs of application requirements, hardware constraints, and a capacity of the computing resources at each datacenter. The central controller selects a location at one or more of the datacenters to execute each application to form a pipeline. The central controller deploys each of the applications to the RIC at the selected locations. Accordingly, the RICs can execute different applications to form a processing pipeline for performing various aspects of vRAN management.

Figures 4A, 4B, 4C:
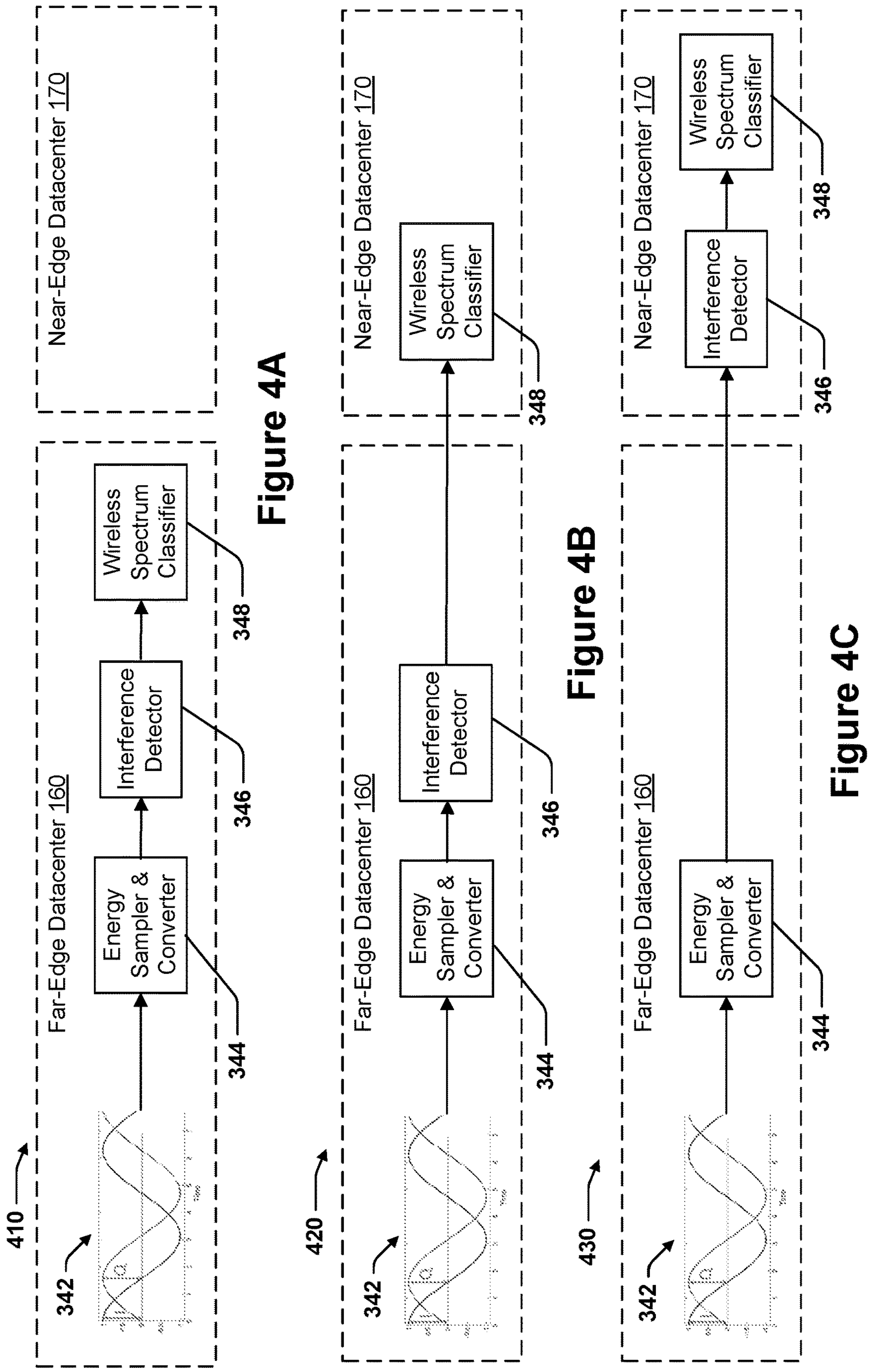
FIGS. 4A, 4B, and 4C are diagrams illustrating possible deployments of the applications for the processing pipeline of FIG. 3C.
Figure 5:
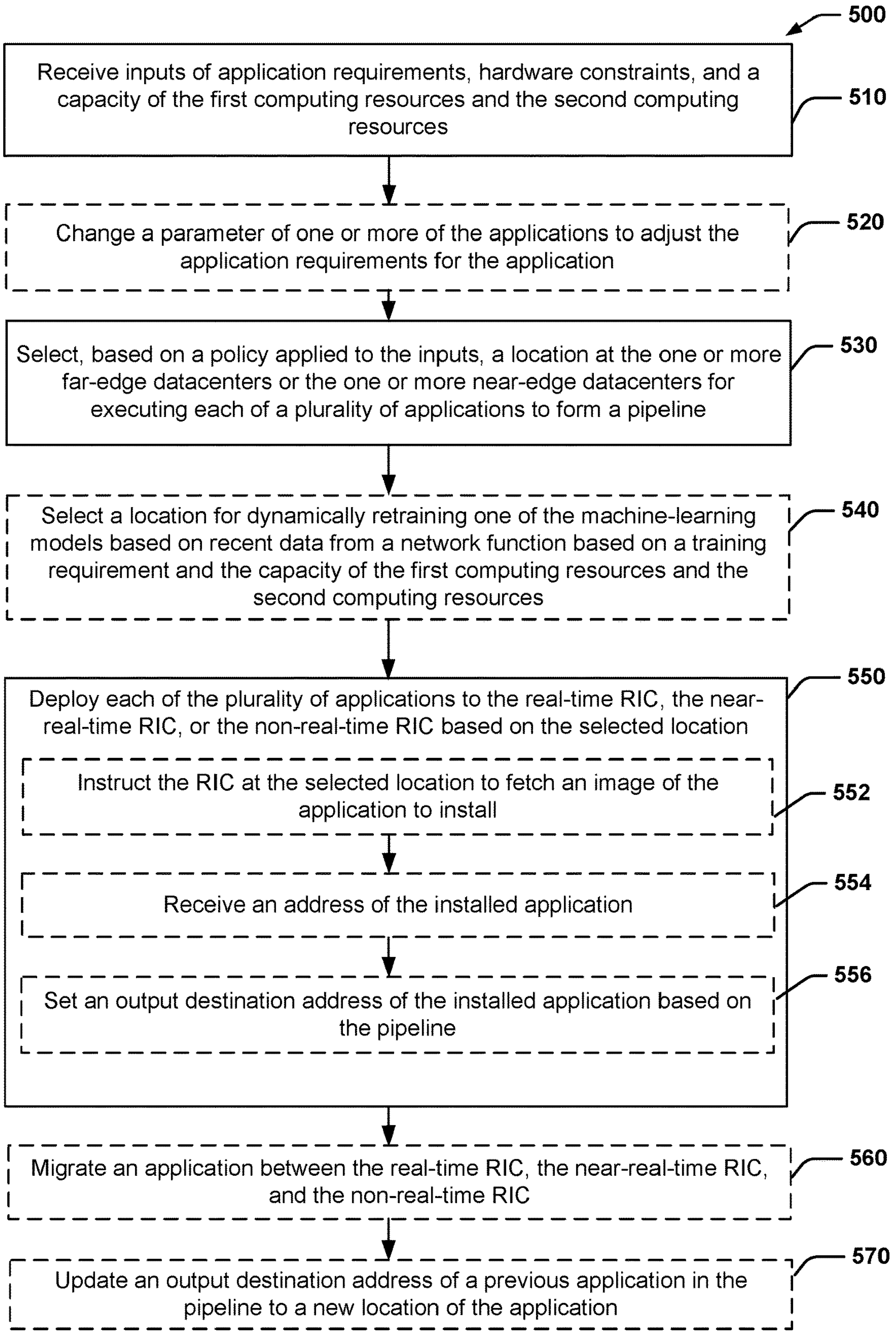
FIG. 5 is a flow diagram of an example of a method for RIC management.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example vRAN 100 that provides connectivity to a user equipment (UE) 110. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 us and 1 ms and a throughput requirement greater than 1 Gbps, the MAC and RLC layers may have latency requirements between 125 us and 1 ms and a throughput requirement greater than 100 Mbps, and the higher layers at the vCU may have latency requirements greater than 125 us and a throughput requirement greater than 100 Mbps.

Higher layer network functions may be referred to as core network functions 150. For example, the core network functions may include one or more Access and Mobility Management Functions (AMFs), a Session Management Function (SMF), and a User Plane Function (UPF). These network functions may provide for management of connectivity of the UE 110. For example, the UPF may provide processing of user traffic to and from the Internet. For instance, a UPF may receive user traffic packets and forward the packets to a server via one or more routers using Internet protocol.

The vRAN 100 includes a RAN intelligent controller (RIC) that performs autonomous configuration and optimization of the vRAN 100. The RIC is implemented at multiple locations as at least a real-time RIC 162 and a near-real-time RIC 172 or a non-real-time RIC 182. For instance, the real-time RIC 162 is executed at a far-edge datacenter 160 that also executes a vRAN function such as the vDU 130 or the vCU 140. The near-real-time RIC 172 is executed at a near-edge datacenter 170. The non-real-time RIC 182 may be executed at either the near-edge datacenter 170 or a cloud datacenter 180. In an aspect, each datacenter is associated with a set of computing resources. For example, the computing resources at the far-edge datacenter 160 are a first set of computing resources and the computing resources at the near-edge datacenter 170 are a second set of computing resources.

Programmability in vRAN functions (e.g., Open RAN components) may be facilitated through the RIC. A network operator can install applications (Apps 152, e.g., xApps in Open RAN) on top of any of the real-time RIC 162. the near real-time RIC 172, or the non-real-time RIC 182. Each RIC may collect network data and may leverage the network data to optimize network performance or report issues on a time-frame based on location. For example, a real-time RIC may operate with latency less than 10 milliseconds (ms); the near-real-time RIC 172 may operates with latency greater than 10 ms to seconds; and the non-real-time RIC 182 may operate with latency greater than 10 seconds.

The RICs may obtain the network data from various sources. For example, the data collection and control of the vRAN components may be facilitated through service models that are embedded in the vRAN functions by vendors. The service models may explicitly define the type and frequency of data reporting for each App 152, as well as a list of control policies that the RIC can use to modify the RAN behavior. Such services models may collect significant network events occur at a relatively low rate (100 s of ms to seconds), which is suitable for the near-real-time RIC 172 and the non-real-time RIC 182. For faster data collection, the network functions may be configured with a codelet to export data from the network function to a local real-time RIC 162. For instance, the codelets may include eBPF codelets (e.g., user space eBPF (uBPF) bytecode) or an operating system eBPF probe that executes in kernel space. The vendors may support such codelets by configuring hooks within the virtual network functions for execution of the eBPF codelets or providing function call information for an operating system eBPF probe. The use of codelets may provide network data at a much faster rate (e.g., less than 1 ms) and may collect larger amounts of network data. Further, the real-time RIC 162 and/or the near-real-time RIC 172 may export network data to other RICs. Moving the network data, however, costs network bandwidth and incurs some latency.

In an aspect, the present disclosure provides for a central controller 190 to manage the RICs. In particular, the central controller 190 may manage execution of apps 152 on different RICs to form a processing pipeline for complex network analytics and control. For instance, a complex network analytic may utilize network data from two or more network functions or may apply network data to two of more machine-learning models. In a processing pipeline, the output from one app 152 serves as input to another app 152. A processing pipeline may be considered a directed acyclic graph. An application repository 184 may store a base version of each app 152. In some implementations, the apps 152 may be further trained or customized for execution on a particular RIC. The central controller 190 may consider the application requirements of each app 152 as well as the hardware constraints and capacity of the computing resources available at each datacenter to each RIC.

In an implementation, the central controller 190 includes an input component 192 configured to receive inputs of application requirements, hardware constraints, and a capacity of the first computing resources of one or more far-edge datacenters 160 and the second computing resources of one or more near-edge datacenters 170. The central controller 190 includes a policy component 194 configured to select, based on a policy applied to the inputs, a location at the one or more far-edge datacenters 160 or the one or more near-edge datacenters 170 for executing each of a plurality of applications 152 to form a pipeline. The central controller 190 includes a deployment component 196 configured to deploy each of the plurality of applications 152 to the real-time RIC 162, the near-real-time RIC 172, or the non-real-time RIC 182 based on the selected location.

Figure 2:
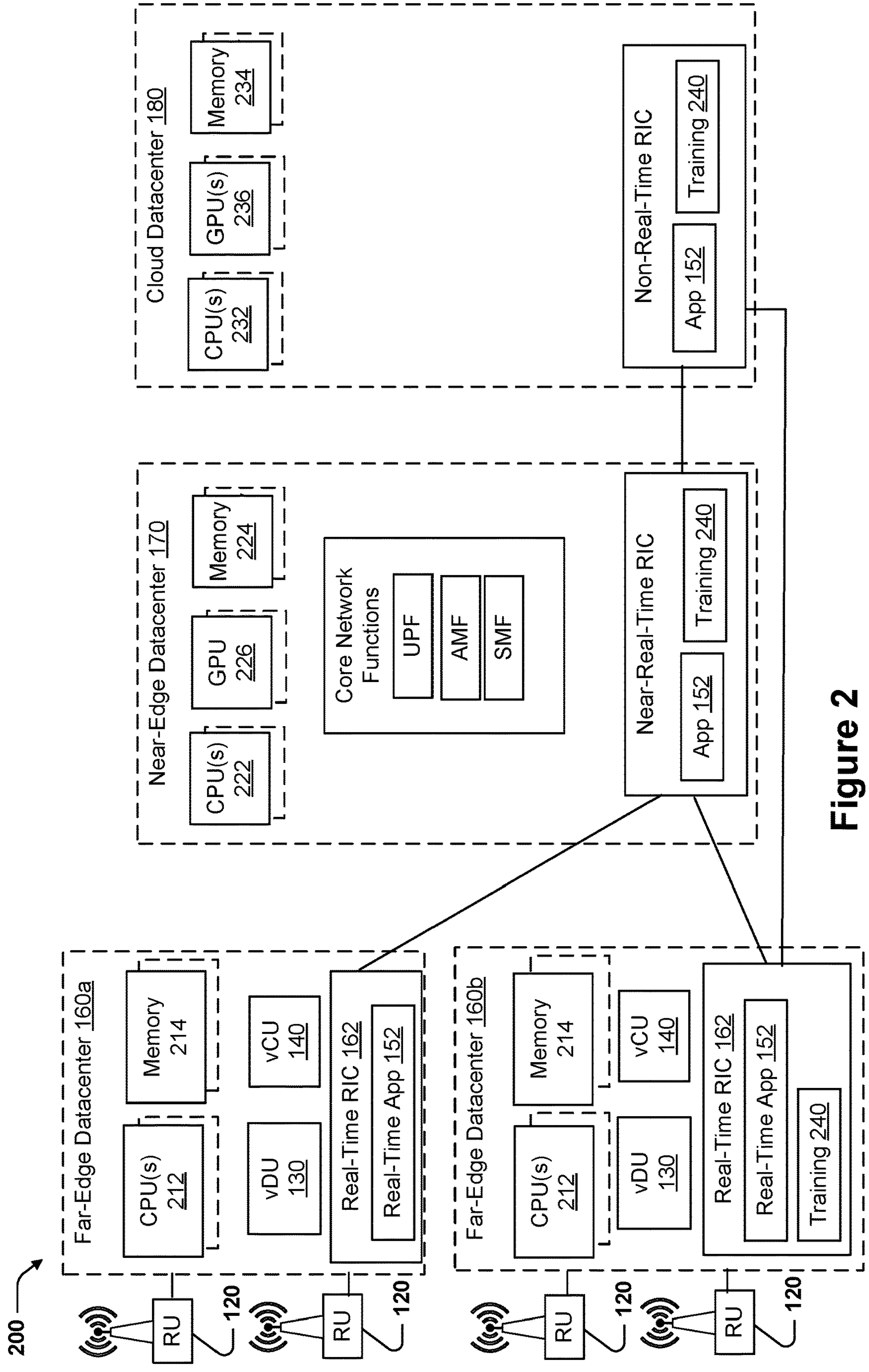
FIG. 2 is a diagram illustrating resources at various datacenters for supporting network functions and a radio intelligent controller (RIC).

FIG. 2 is a diagram 200 illustrating resources at various datacenters for supporting network functions and a RIC. The far-edge datacenters 160 (e.g., far-edge datacenters 160*a* and 160*b*) may have first resources including CPU(s) 212 and memory 214. The near-edge datacenter 170 may have second resources including CPU(s) 222, memory 224, and GPUs 226. The cloud datacenter 180 has third resources including CPU(s) 232, memory 234, and GPUs 236. In some implementations, the far-edge datacenters 160, near-edge datacenters 170, and the cloud datacenter 180 include a multi-core system.

A multi-core system may take advantage of multi-threaded parallel processing capabilities of multiple processor cores. For example, a multi-core system may include a CPU 212, 222, 232 such as a server grade X86 processor. The multi-core system may have one or more physical chips that provide a plurality of virtual CPUs (vCPUs). Each vCPU may be able to handle a thread of execution in parallel with the other vCPUs. In a general purpose multi-core system, an operating system may use context switching to assign different threads of execution to vCPUs as needed. In some implementations, a multi-core system may lock one or more vCPUs to certain threads of execution for virtual functions. For instance, in an implementation, a plurality of the processor cores (e.g., vCPUs) may be locked to a virtual function thread of execution using a pull mode driver that occupies the processor core at all times. Locking a thread of execution to a processor core may reduce the overhead of context switching among threads and improve performance of the virtual function. For instance, a virtual function (e.g., vDU 130 or vCU 140) may execute on a respective processor core without interruption. In an implementation, capacity of a datacenter 160 may be measured in a number of available processor cores.

In an aspect, the second resources of the near-edge datacenter 170 are greater than the first resources of one of the far-edge datacenters 160, and the third resources of the cloud datacenter 180 are greater than the second resources. Conversely, latency is lowest at the far-edge datacenters 160, followed by the near-edge datacenter 170, and lastly the cloud datacenter 180. Accordingly, there is generally a tradeoff between executing an app 152 at a far-edge datacenter 160 to achieve lower latency and the costs or constraints due to the relatively limited resources. For example, a far-edge datacenter 160 may not have a GPU (or an available GPU) for executing large machine-learning models. Similarly, although the near-edge datacenter 170 or cloud datacenter 180 have greater resources, the added latency of moving network data to remote datacenters may result in an inability to satisfy a latency requirement of a particular app 152 or network function. Accordingly, the central controller 190 is configured to deploy apps 152 to selected datacenters based on a policy applied to application requirements, hardware constraints, and resource capacity.

In an aspect, an app 152 may be customized or trained for a specific deployment. For instance, some ML models for predicting behavior may be dependent upon a particular cell supported by an RU 120. For instance, a cell that covers an office building may experience greater usage during business hours in comparison to a cell that covers an apartment building, which may experience a different usage pattern. Accordingly, an app 152 for predicting traffic may be trained for a specific RU in a training operation 240. The training operation 240 may be similar to an app 152 in that the training operation 240 utilizes computing resources at a data center and may require moving training data between datacenters. The central controller 190 may be configured to select a location for dynamically retraining an app 152 including a machine-learning model based on recent data from a network function based on a training requirement and the capacity of the first computing resources and the second computing resources. The training requirement may be a frequency of retraining or a size of a training set. The capacity may be a number of available processor cores. For example, the central controller 190 may select the far-edge datacenter 160 for training operation 240 when the size of the training set is large or the frequency of retraining is high, but may select the near-edge datacenter 170 for training operation 240 when the far-edge datacenter 160 has low capacity or a GPU 226 would speed up the training operation 240.

In another aspect, the requirements of an app 152 may be adjusted. For instance, a model may be executed with different sample sizes or rates that correspond to different resource utilizations or latencies. Where a requirement of the app 152 cannot be satisfied at the most desirable location, the central controller 190 may adjust a parameter of the app 152 to adjust the requirement rather than deploying the app 152 to a different location.

In another aspect, an app 152 may be migrated between locations. For instance, after an app 152 is deployed to a far-edge datacenter 160, the capacity of the far-edge datacenter 160 may change. For instance, additional users connected to a cell supported on the far-edge datacenter 160 may increase the demand for the vDU 130, which may be allocated additional resources. Accordingly, the capacity of the far edge datacenter 160 may no longer support the app 152. The central controller 190 may monitor the changes in capacity and migrate the app 152 from the far-edge datacenter 160 to the near-edge datacenter 170. The central controller 190 may migrate an app 152 from a near-edge datacenter 170 to a far-edge datacenter 160, for example, when capacity at the far-edge datacenter 160 increases. Additionally, the central controller 190 may migrate an app 152 due to a fault at a current location (e.g., to another near-edge datacenter 170) or due to connectivity issues between datacenters.

Figure 3A:
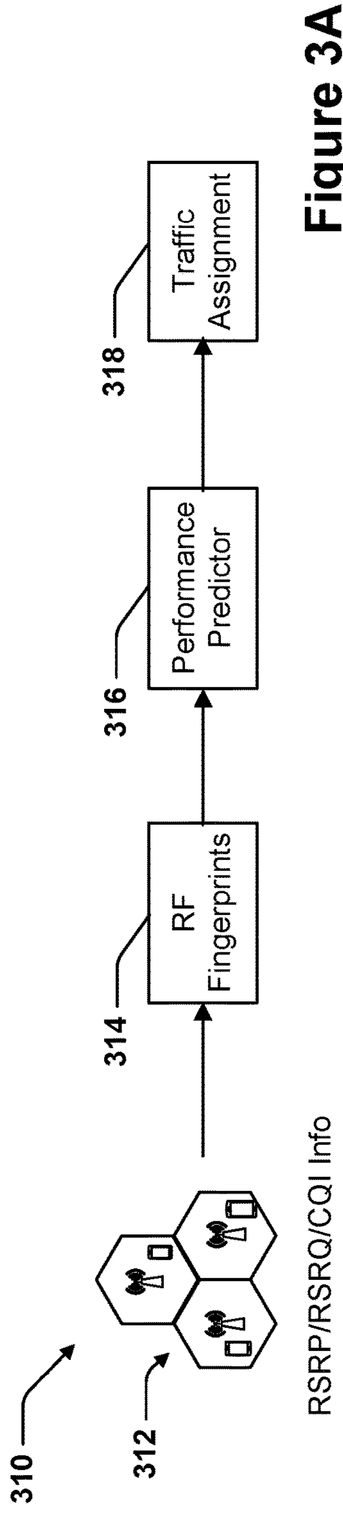
FIGS. 3A, 3B, and 3C illustrate processing pipelines of various applications for performing machine-learning analysis of network data.
Figure 3B:
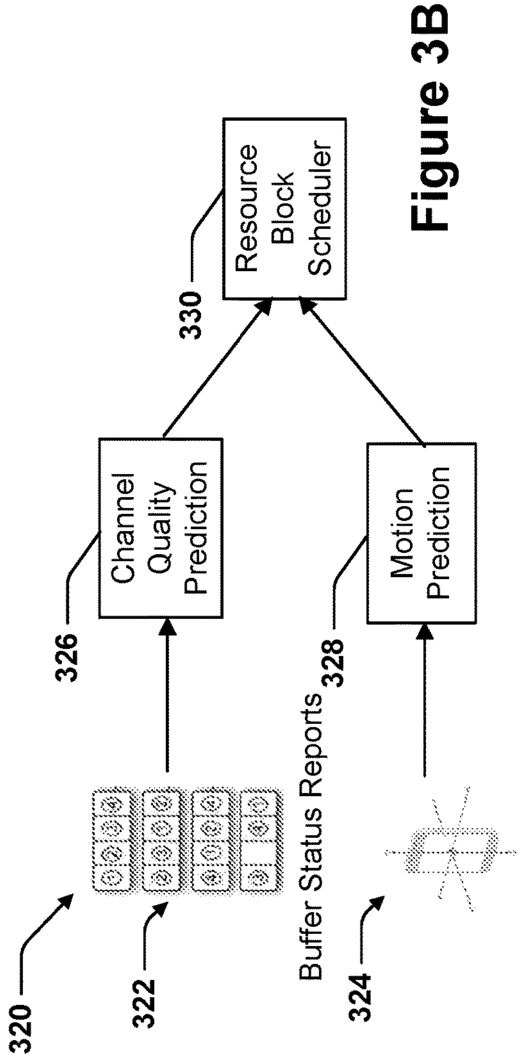
Figure 3C:
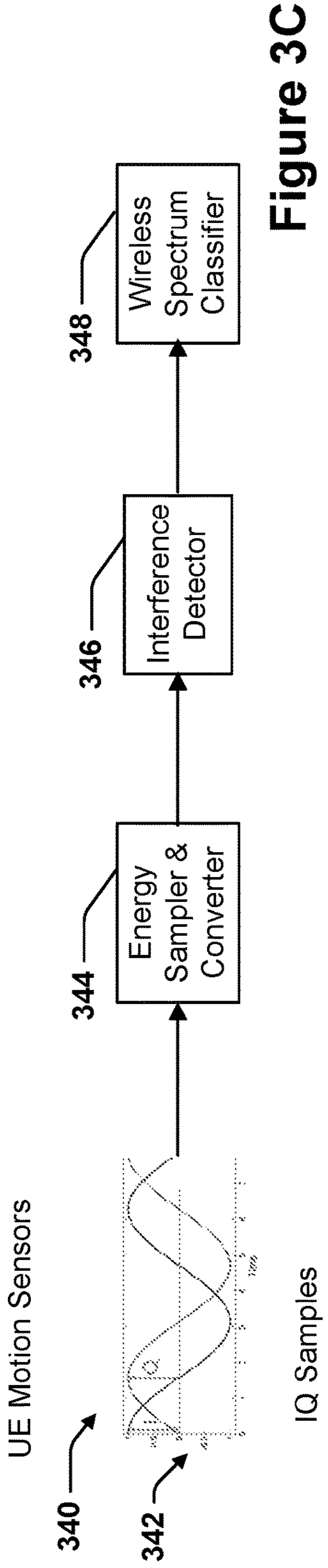

FIGS. 3A, 3B, and 3C illustrate processing pipelines of various apps 152 for performing machine-learning analysis of network data. Although several examples are provided, it should be appreciated that the framework described herein provides flexibility to create processing pipelines using the apps described herein or any customized apps, for example, as programmed for the particular needs of a network operator.

The following are example use cases for artificial intelligence (AI) or machine-learning (ML) models to improve cost and performance of a vRAN. In particular, AI or ML models are useful for solving computationally intractable problems in RAN management such as prediction and classification.

A first example use case is predicting available radio bandwidth for quality of experience (QoE) optimization. The availability of radio bandwidth may depend on numerous factors including number of user equipment (UE), channel conditions for each UE, timing requirements for data streams, etc. Many of these factors may change over time. An example processing pipeline for predicting available bandwidth may include an individual predictor of one or more factors and another model to combine the various predictions.

A second example use case is cellular traffic prediction for server utilization. For example, each far-edge datacenter 160 may implement multiple vRAN functions to handle processing load, which varies based on an amount of cellular traffic. For instance, the amount of PHY layer processing at the vDU 130 may be based on the amount of data transmitted between the RUs 120 and UEs 110. The far-edge datacenter 160 may dynamically allocate CPUs 212 to vDU 130 handle the load. A processing pipeline for cellular traffic prediction for server utilization may obtain measurements of data rate per UE 110 as well as CPU utilization of the vDU 130. The data rate per UE 110 may be combined with higher layer events such as session and stream management to predict future data rate, which can be used to predict required CPUs for the vDU 130.

A third example use case is traffic steering by predicting UE-cell performance. For instance, the performance of a UE may vary based on movement of the UE within a cell. Some UEs may be within the coverage area of multiple cells. Conventionally, a UE measures signal quality and sends a report to the network when various conditions are satisfied to initiate a handover. Machine-learning may be used to improve handovers by predicting how UE-cell performance is likely to change. The network may then handover a UE based on the prediction rather than waiting for the performance of the current cell to degrade.

For example, as illustrated in FIG. 3A, a processing pipeline 310 for traffic steering may operate on UE measurement report information 312. For instance, the UE measurement report information 312 may include a reference signal received power (RSRP), a reference signal received quality (RSRQ), and/or a channel quality indicator (CQI). The UE measurement report information 312 may be obtained from the PHY layer of the vDU 130 at the far-edge datacenter 160. A first app 314 may classify the UE measurement report information 312 into an RF fingerprint. For example, the RF fingerprints may be patterns of UE measurement report information 312 with similar performance. A second app 316 may be a performance predictor configured to predict performance of a UE based on the RF fingerprint. For instance, the performance predictor may combine the RF fingerprint with higher layer information. A third app 318 may perform traffic assignment. For instance, the third app 318 may handover the UE to a cell based on the predicted performance.

A fourth example use case is MAC scheduling of resource blocks using predicted qualities. Buffer status reports 322 may be obtained from the PHY layer of the vDU 130 at the far-edge datacenter 160. Similarly, UE motion sensor information 324 may be obtained from the PHY layer of the vDU 130 at the far-edge datacenter 160. A first app 326 may perform channel quality prediction based on the buffer status reports 322. A second app 328 may perform motion prediction based on the UE motion sensor information 324. A third app 330 may schedule transmission of resource blocks based on the predicted channel quality and the predicted motion. For instance, the third app 330 may select a modulation and coding scheme (MCS) and beam for transmitting one or more resource blocks.

A fifth example use case is interference detection and classification. In shared bandwidth, multiple networks may attempt to use the same radio resource (e.g., frequency), which may cause interference to the other devices. Although most wireless standards include mechanisms to share bandwidth and/or mitigate interference, channel leakage as well as rogue devices are possible. Conventionally, a UE or network function may measure signals indicative of interference, but may not be able to identify a source.

A processing pipeline 340 for interference detection and classification may start with IQ samples from the PHY layer of the vDU 130. A first app 344 may be an energy sampler and converter that samples (or sub-samples) the IQ samples 342 and converts the IQ samples to a detected energy level. A second app 346 may be an interference detector that determines whether the detected energy levels are indicative of interference. For example, the second app 346 may compare the energy levels to predicted energy levels for the expected transmission. A third app 348 may be a wireless spectrum classifier that classifies the detected interference as a type of radio network. For instance, the third app 348 may determine whether a pattern of the detected interference corresponds to a 5G, 4G-LTE, Wi-Fi or other network.

FIGS. 4A, 4B, and 4C are diagrams illustrating possible deployments 410, 420, 430 of the apps 344, 346, and 348 for the processing pipeline 340. In the first deployment 410, the collection of the IQ samples 342 occurs at the far-edge datacenter 160. Further, each of the apps 344, 346, and 348 may be executed at the far-edge datacenter 160 and no apps are executed at the near-edge datacenter 170. In the second deployment 420, the collection of the IQ samples 342 occurs at the far-edge datacenter 160. Further, the first apps 344 and the second app 346 are executed at the far-edge datacenter 160 and the third app 348 is executed at the near-edge datacenter 170. In the third deployment 430, the collection of the IQ samples 342 occurs at the far-edge datacenter 160. Further, the first app 344 is executed at the far-edge datacenter 160, and the second app 346 and the third app 348 are executed at the near-edge datacenter 170.

In an aspect, the collection of the IQ samples 342 always occurs at the vDU 130 executed on the far-edge datacenter 160 (e.g., by a codelet on the vDU 130). Because the IQ samples may be quite large (e.g., approximately 5 Gbps per cell for 100 MHZ 4×4 MIMO), the first app 344 for sampling and converting the IQ samples to energy levels may be deployed at the real-time RIC 162. For instance, a policy of the central controller 190 may always allocate an app with an application requirement of an input data stream that exceeds a threshold size to the real-time RIC 162.

The second app 346 and the third app 348 may have latency requirements that depend on the RU 120 or corresponding coverage area of the RU 120. For example, a high priority RU 120 or coverage area (e.g., a secure area of a building) may have a lower latency requirement to detect interference, while a lower priority RU 120 or coverage area (e.g., public access) may have a more lenient latency requirement. Further the policy may depend on hardware constraints at the far-edge datacenter 160. For instance, if the third app 348 utilizes a large ML-model that can only be executed within the latency requirement using a GPU 226, 236, the policy may require the third app 348 to be deployed to the near-edge datacenter 170. The policy may also depend on the capacity of the first computing resources at the far-edge datacenter 160 and the second computing resource at the near-edge datacenter 170. For instance, if the number of UEs is relatively high, the far-edge datacenter 160 may allocate the limited CPUs 212 and memory 214 to the vDU 130. Accordingly, the far-edge datacenter 160 may not have capacity for the second app 346 or the third app 348, which may then be migrated to the near-edge datacenter 170.

FIG. 5 is a flow diagram of an example of a method 500 for RIC management. For example, the method 500 can be performed by a datacenter including one or more memories and one or more processors configured to execute the central controller 190. For instance, the central controller 190 may be instantiated on the cloud datacenter 180 or the near-edge datacenter 170.

At block 510, the method 500 includes receiving inputs of application requirements, hardware constraints, and a capacity of first computing resources and second computing resources. In an example, the cloud datacenter 180, e.g., in conjunction with one or more CPUs 232 or memory 234, can execute the central controller 190 and/or input component 192 to receive inputs of application requirements, hardware constraints, and a capacity of the first computing resources (e.g., CPU(s) 212 and memory 214 at far-edge datacenter 160) and the second computing resources (e.g., CPU(s) 222, memory 224, and GPU 226 at near-edge datacenter 170). For instance, the input component 192 may receive the application requirements from the application repository 184. The input component 192 may receive the hardware constraints and the capacity of the first computing resources from the far-edge datacenter 160. The input component 192 may receive the hardware constraints and the capacity of the second computing resources from the near-edge datacenter 170. In some implementations, the application requirements include a latency requirement, a bandwidth requirement, or an accuracy requirement.

At block 520, the method 500 may optionally include changing a parameter of one or more of the applications to adjust the application requirements for the application. In an example, the cloud datacenter 180, e.g., in conjunction with one or more CPUs 232 or memory 234, can execute the central controller 190 and/or policy component 194 to change a parameter of one or more of the applications to adjust the application requirements for the application. For instance, the policy component 194 may change an input size to produce a result within the latency requirement, bandwidth requirement, or accuracy requirement. A lower input size (e.g., lower sampling rate) may reduce a latency and bandwidth, but also lower the accuracy.

At block 530, the method 500 includes selecting, based on a policy applied to the inputs, a location at the one or more far-edge datacenters or the one or more near-edge datacenters for executing each of a plurality of applications to form a pipeline. In an example, the cloud datacenter 180, e.g., in conjunction with one or more CPUs 232 or memory 234, can execute the central controller 190 and/or policy component 194 to select, based on a policy applied to the inputs, a location at the one or more far-edge datacenters 160 or the one or more near-edge datacenters 170 for executing each of a plurality of applications 152 to form a pipeline 310, 320, 340.

At block 540, the method 500 may optionally include selecting a location for dynamically retraining one of the machine-learning models based on recent data from a network function based on a training requirement and the capacity of the first computing resources and the second computing resources. In an example, the cloud datacenter 180, e.g., in conjunction with one or more CPUs 232 or memory 234, can execute the central controller 190 and/or policy component 194 to select a location (e.g., one of far-edge datacenter 160, near-edge datacenter 170, or cloud datacenter 180) for dynamically retraining one of the machine-learning models (of application 152) based on recent data from a network function (e.g., vDU 130 or vCU 140) based on a training requirement and the capacity of the first computing resources and the second computing resources. For instance, the policy component 194 may select a location with the lowest cost resources available that can satisfy the training requirement.

At block 550, the method 500 includes deploy each of the plurality of applications to the real-time RIC, the near-real-time RIC, or the non-real-time RIC based on the selected location. In an example, the cloud datacenter 180, e.g., in conjunction with one or more CPUs 232 or memory 234, can execute the central controller 190 and/or the deployment component 196 to deploy each of the plurality of applications 152 (e.g., applications 344, 346, 348) to the real-time RIC 162, the near-real-time RIC 172, or the non-real-time RIC 182 based on the selected location. In some implementations, one or more of the plurality of applications is implemented as a container, web assembly code, or eBPF code and configured to apply network data to a machine-learning model. In some implementations, at sub-block 552, the block 550 may optionally include instruct the RIC at the selected location to fetch an image of the application to install. For instance, the deployment component 196 may provide an identifier of the application within the application repository 184. In some implementations, at sub-block 554, the block 550 may optionally include receiving an address of the installed application. For instance, the address may be an IP address and port number of the installed application at the selected RIC. In some implementations, at sub-block 556, the block 550 may optionally include setting an output destination address of the installed application based on the pipeline. For example, the deployment component 196 may indicate to a first application 344 the address of the second application 346 to use as the destination address of the installed first application.

At block 560, the method 500 may optionally include migrating an application between the real-time RIC, the near-real-time RIC, and the non-real-time RIC. In an example, the cloud datacenter 180, e.g., in conjunction with one or more CPUs 232 or memory 234, can execute the central controller 190 and/or policy component 194 to migrate an application (e.g., application 346) between the real-time RIC 162, the near-real-time RIC 172, and the non-real-time RIC 182. For instance, the policy component 194 may migrate the application 346 from the real-time RIC 162 on the far-edge datacenter 160 as in deployment 420 to the near-real-time RIC 172 on the near-edge datacenter 170 as in deployment 430. The migrating may be in response to a current capacity at a current location for the application, a fault at the current location for the application, or a connectivity issue between the one or more far-edge datacenters and the one or more near-edge datacenters.

At block 570, the method 500 may optionally include updating an output destination address of a previous application in the pipeline to a new location of the application. In an example, the cloud datacenter 180, e.g., in conjunction with one or more CPUs 232 or memory 234, can execute the central controller 190 and/or deployment component 196 to update an output destination address of a previous application (e.g., application 344) in the pipeline 340 to a new location (e.g., near-edge datacenter 170) of the application 346.

Figure 6:
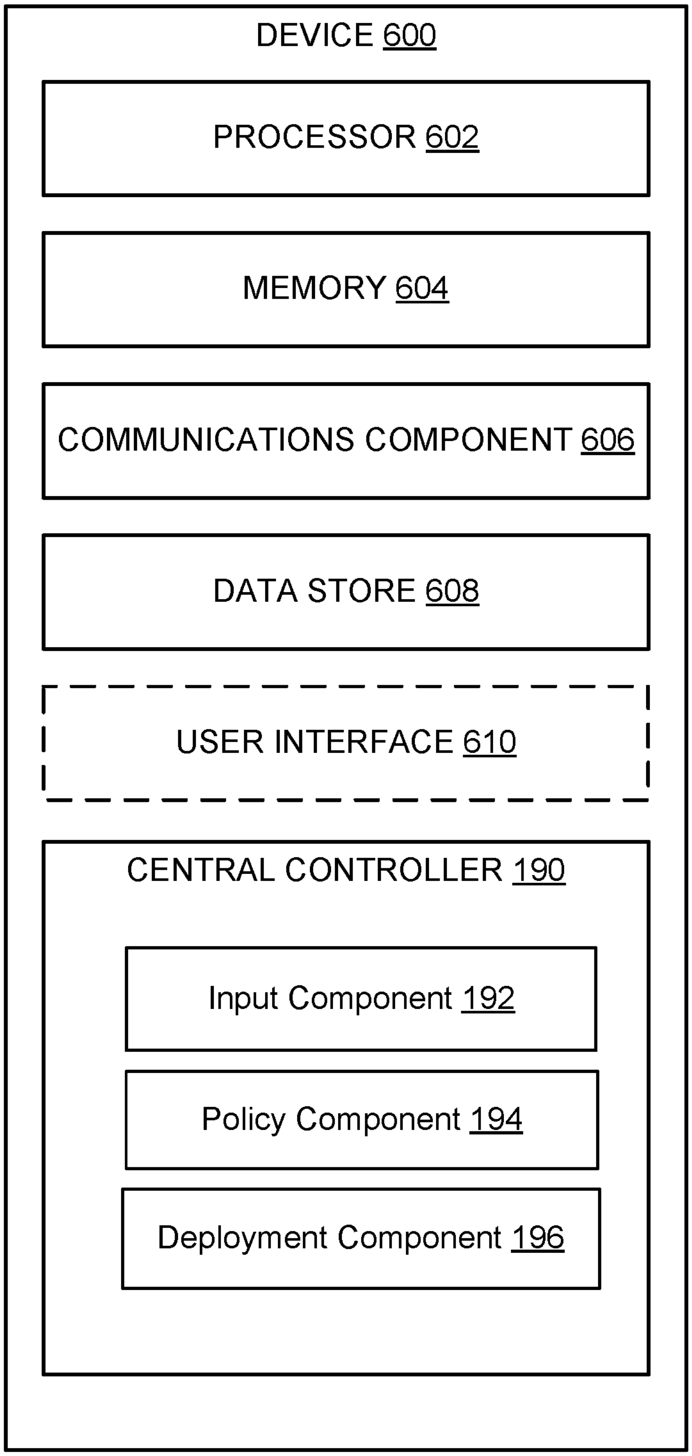
FIG. 6 illustrates an example of a device including additional optional component details as those shown in FIG. 2.

FIG. 6 illustrates an example of a device 600 including additional optional component details as those shown in FIG. 2. In one aspect, device 600 may include one or more processors 602, which may be similar to CPU(s) 232 for carrying out processing functions associated with one or more of components and functions described herein. Processor(s) 602 can include a single or multiple set of processors or multi-core processors. Moreover, processor(s) 602 can be implemented as an integrated processing system and/or a distributed processing system.

Device 600 may further include one or more memory/memories 604, which may be similar to memory 234 such as for storing local versions of operating systems (or components thereof) and/or applications being executed by processor(s) 602, such as central controller 190. Memory/memories 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor(s) 602. In addition, data store 608 may be a data repository for non-real-time RIC 182, application repository 184, central controller 190, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include the central controller 190 including the input component 192, the policy component 194, and the deployment component 196 as described herein.

The following numbered clauses provide an overview of aspects of the present disclosure:

Clause 1. A system for executing applications for radio interface controller (RIC) management, comprising: one or more far-edge datacenters each including first computing resources configured to execute a radio access network (RAN) function and a real-time RIC; one or more near-edge datacenters each including second computing resources configured to execute a core network function and at least one of a near-real-time RIC or a non-real-time RIC; and a central controller configured to: receive inputs of application requirements, hardware constraints, and a capacity of the first computing resources and the second computing resources; select, based on a policy applied to the inputs, a location at the one or more far-edge datacenters or the one or more near-edge datacenters for executing each of a plurality of applications to form a pipeline; and deploy each of the plurality of applications to the real-time RIC, the near-real-time RIC, or the non-real-time RIC based on the selected location.

Clause 2. The system of clause 1, wherein one or more of the plurality of applications are configured to apply network data to a machine-learning model.

Clause 3. The system of clause 2, wherein the central controller is configured to select a location for dynamically retraining one of the machine-learning models based on recent data from a network function based on a training requirement and the capacity of the first computing resources and the second computing resources.

Clause 4. The system of any of clauses 1-3, wherein is one or more of the plurality of applications are implemented as a container, web assembly code, or extended Berkeley packet filter (eBPF) code.

Clause 5. The system of any of clauses 1-4, wherein the central controller is configured to change a parameter of one or more of the applications to adjust the application requirements for the application.

Clause 6. The system of any of clauses 1-5, wherein to deploy each of the plurality of applications, the central controller is configured to: instruct the RIC at the selected location to fetch an image of the application to install; receive an address of the installed application; and set an output destination address of the installed application based on the pipeline.

Clause 7. The system of any of clauses 1-6, wherein the central controller is configured to migrate an application between the real-time RIC, the near-real-time RIC, and the non-real-time RIC and update an output destination address of a previous application in the pipeline to a new location of the application.

Clause 8. The system of clause 7, wherein the migration is in response to a current capacity at a current location for the application, a fault at the current location for the application, or a connectivity issue between the one or more far-edge datacenters and the one or more near-edge datacenters.

Clause 9. The system of any of clauses 1-8, wherein the application requirements include a latency requirement, a bandwidth requirement, or an accuracy requirement.

Clause 10. A method for radio interface controller (RIC) management of virtualized network functions, comprising, at a central controller: receiving inputs of application requirements, hardware constraints, and a capacity of: one or more far-edge datacenters each including first computing resources configured to execute a radio access network (RAN) function and a real-time RIC; and one or more near-edge datacenters each including second computing resources configured to execute a core network function, a near-real-time RIC, and a non-real-time RIC; selecting, based on a policy applied to the inputs, a location at the one or more far-edge datacenters or the one or more near-edge datacenters for executing each of a plurality of applications to form a pipeline; and deploying each of the plurality of applications to the real-time RIC, the near-real-time RIC, or the non-real-time RIC based on the selected location.

Clause 11. The method of clause 10, wherein one or more of the plurality of applications is configured to apply network data to a machine-learning model.

Clause 12. The method of clause 11, further comprising selecting a location for dynamically retraining one of the machine-learning models based on recent data from a network function based on a training requirement and the capacity of the first computing resources and the second computing resources.

Clause 13. The method of any of clauses 10-12, wherein one or more of the plurality of applications is implemented as a container, web assembly code, or extended Berkeley packet filter (eBPF) code and Clause 14. The method of any of clauses 10-13, further comprising changing a parameter of one or more of the applications to adjust the application requirements for the application.

Clause 15. The method of any of clauses 10-14, wherein deploying each of the plurality of applications comprises: instructing the RIC at the selected location to fetch an image of the application to install; receiving an address of the installed application; and setting an output destination address of the installed application based on the pipeline.

Clause 16. The method of any of clauses 10-15, further comprising: migrating an application between the real-time RIC, the near-real-time RIC, and the non-real-time RIC; and updating an output destination address of a previous application in the pipeline to a new location of the application.

Clause 17. The method of clause 16, wherein the migrating is in response to a current capacity at a current location for the application, a fault at the current location for the application, or a connectivity issue between the one or more far-edge datacenters and the one or more near-edge datacenters.

Clause 18. The method of any of clauses 10-17, wherein the application requirements include a latency requirement or a bandwidth requirement.

Clause 19. One or more non-transitory computer-readable media having stored thereon compute-executable instructions that when executed by one or more processors, individually or in combination, cause the one or more processors to: receive inputs of application requirements, hardware constraints, and a capacity of: one or more far-edge datacenters each including first computing resources configured to execute a radio access network (RAN) function and a real-time RIC; and one or more near-edge datacenters each including second computing resources configured to execute a core network function, a near-real-time RIC, and a non-real-time RIC; select, based on a policy applied to the inputs, a location at the one or more far-edge datacenters or the one or more near-edge datacenters for executing each of a plurality of applications to form a pipeline; and deploy each of the plurality of applications to the real-time RIC, the near-real-time RIC, or the non-real-time RIC based on the selected location.

Clause 20. The one or more non-transitory computer-readable media of clause 19, wherein one or more of the plurality of applications is implemented as a container, web assembly code, or extended Berkeley packet filter (eBPF) code and configured to apply network data to a machine-learning model, the one or more non-transitory computer-readable media further comprising compute-executable instructions to select a location for dynamically retraining one of the machine-learning models based on recent data from a network function based on a training requirement and the capacity of the first computing resources and the second computing resources.

Clause 21. The one or more non-transitory computer-readable media of clause 19 or 20, wherein the instructions to deploy each of the plurality of applications comprise instructions to: instruct the RIC at the selected location to fetch an image of the application to install; receive an address of the installed application; and set an output destination address of the installed application based on the pipeline.

Clause 22. The one or more non-transitory computer-readable media of any of clauses 19-21, further comprising instructions to: migrate an application between the real-time RIC, the near-real-time RIC, and the non-real-time RIC in response to a current capacity at a current location for the application or a fault at the current location for the application; and update an output destination address of a previous application in the pipeline to a new location of the application.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer readable media specifically exclude transitory signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system for executing applications for radio interface controller (RIC) management, comprising:
- one or more far-edge datacenters each including first computing resources configured to execute a radio access network (RAN) function and a real-time RIC;
- one or more near-edge datacenters each including second computing resources configured to execute a core network function and at least one of a near-real-time RIC or a non-real-time RIC; and
- a central controller configured to:
  - receive inputs of application requirements, hardware constraints, and a capacity of the first computing resources and the second computing resources;
  - select, based on a policy applied to the inputs, a location for executing each of a plurality of applications including a first location at the one or more far-edge datacenters for a first application of the plurality of applications and a second location at the one or more far-edge datacenters or the one or more near-edge datacenters to form a pipeline from the first application to the second application; and
  - deploy each of the plurality of applications to the real-time RIC, the near-real-time RIC, or the non-real-time RIC based on the selected location of each of the plurality of applications.

2. The system of claim 1, wherein one or more of the plurality of applications are configured to apply network data to a machine-learning model.

3. The system of claim 2, wherein the central controller is configured to select a location for dynamically retraining one of the machine-learning models based on recent data from a network function based on a training requirement and the capacity of the first computing resources and the second computing resources.

4. The system of claim 1, wherein is one or more of the plurality of applications are implemented as a container, web assembly code, or extended Berkeley packet filter (eBPF) code.

5. The system of claim 1, wherein the central controller is configured to change a parameter of one or more of the applications to adjust the application requirements for the application.

6. The system of claim 1, wherein to deploy each of the plurality of applications, the central controller is configured to:
- instruct the RIC at the selected location to fetch an image of the application to install;
- receive an address of the installed application; and
- set an output destination address of the installed application based on the pipeline.

7. The system of claim 1, wherein the central controller is configured to migrate an application between the real-time RIC, the near-real-time RIC, and the non-real-time RIC and update an output destination address of a previous application in the pipeline to a new location of the application.

8. The system of claim 7, wherein the migration is in response to a current capacity at a current location for the application, a fault at the current location for the application, or a connectivity issue between the one or more far-edge datacenters and the one or more near-edge datacenters.

9. The system of claim 1, wherein the application requirements include a latency requirement, a bandwidth requirement, or an accuracy requirement.

10. A method for radio interface controller (RIC) management of virtualized network functions, comprising, at a central controller:
- receiving inputs of application requirements, hardware constraints, and a capacity of:
  - one or more far-edge datacenters each including first computing resources configured to execute a radio access network (RAN) function and a real-time RIC; and
  - one or more near-edge datacenters each including second computing resources configured to execute a core network function, a near-real-time RIC, and a non-real-time RIC;
- selecting, based on a policy applied to the inputs, a location for executing each of a plurality of applications including a first location at the one or more far-edge datacenters for a first application of the plurality of applications and a second location at the one or more far-edge datacenters or the one or more near-edge datacenters to form a pipeline from the first application to the second application; and
- deploying each of the plurality of applications to the real-time RIC, the near-real-time RIC, or the non-real-time RIC based on the selected location of each of the plurality of applications.

11. The method of claim 10, wherein one or more of the plurality of applications is configured to apply network data to a machine-learning model.

12. The method of claim 11, further comprising selecting a location for dynamically retraining one of the machine-learning models based on recent data from a network function based on a training requirement and the capacity of the first computing resources and the second computing resources.

13. The method of claim 10, wherein one or more of the plurality of applications is implemented as a container, web assembly code, or extended Berkeley packet filter (eBPF) code.

14. The method of claim 10, further comprising changing a parameter of one or more of the applications to adjust the application requirements for the application.

15. The method of claim 10, wherein deploying each of the plurality of applications comprises:
- instructing the RIC at the selected location to fetch an image of the application to install;
- receiving an address of the installed application; and setting an output destination address of the installed application based on the pipeline.

16. The method of claim 10, further comprising:

migrating an application between the real-time RIC, the near-real-time RIC, and the non-real-time RIC; and updating an output destination address of a previous application in the pipeline to a new location of the application.

17. The method of claim 16, wherein the migrating is in response to a current capacity at a current location for the application, a fault at the current location for the application, or a connectivity issue between the one or more far-edge datacenters and the one or more near-edge datacenters.

18. The method of claim 10, wherein the application requirements include a latency requirement or a bandwidth requirement.

19. One or more non-transitory computer-readable media having stored thereon compute-executable instructions that when executed by one or more processors, individually or in combination, cause the one or more processors to:

receive inputs of application requirements, hardware constraints, and a capacity of:

one or more far-edge datacenters each including first computing resources configured to execute a radio access network (RAN) function and a real-time RIC; and one or more near-edge datacenters each including second computing resources configured to execute a core network function, a near-real-time RIC, and a non-real-time RIC;

select, based on a policy applied to the inputs, a location for executing each of a plurality of applications including a first location at the one or more far-edge datacenters for a first application of the plurality of applications and a second location at the one or more far-edge datacenters or the one or more near-edge datacenters to form a pipeline from the first application to the second application; and deploy each of the plurality of applications to the real-time RIC, the near-real-time RIC, or the non-real-time RIC based on the selected location of each of the plurality of applications.

20. The one or more non-transitory computer-readable media of claim 19, wherein one or more of the plurality of applications is implemented as a container, web assembly code, or extended Berkeley packet filter (eBPF) code and configured to apply network data to a machine-learning model, the one or more non-transitory computer-readable media further comprising compute-executable instructions to select a location for dynamically retraining one of the machine-learning models based on recent data from a network function based on a training requirement and the capacity of the first computing resources and the second computing resources.

21. The one or more non-transitory computer-readable media of claim 19, wherein the instructions to deploy each of the plurality of applications comprise instructions to:

instruct the RIC at the selected location to fetch an image of the application to install;

receive an address of the installed application; and set an output destination address of the installed application based on the pipeline.

22. The one or more non-transitory computer-readable media of claim 19, further comprising instructions to:

migrate an application between the real-time RIC, the near-real-time RIC, and the non-real-time RIC in response to a current capacity at a current location for the application or a fault at the current location for the application; and update an output destination address of a previous application in the pipeline to a new location of the application.

* * * * *